(12) United States Patent
Togashi et al.

(10) Patent No.: US 7,586,174 B2
(45) Date of Patent: Sep. 8, 2009

(54) MULTILAYER CAPACITOR

(75) Inventors: Masaaki Togashi, Nikaho (JP); Taisuke Ahiko, Nikaho (JP)

(73) Assignee: TDK Corporation, Tokyo (JP)

( * ) Notice: Subject to any disclaimer, the term of this patent is extended or adjusted under 35 U.S.C. 154(b) by 220 days.

(21) Appl. No.: 11/490,102

(22) Filed: Jul. 21, 2006

(65) Prior Publication Data

US 2007/0025057 A1 Feb. 1, 2007

(30) Foreign Application Priority Data

Jul. 29, 2005 (JP) ............................. 2005-222030

(51) Int. Cl.
*H01L 29/92* (2006.01)

(52) U.S. Cl. .............................. 257/532; 257/E27.048; 361/303

(58) Field of Classification Search ................. 257/532, 257/E27.048; 361/303, 306.3
See application file for complete search history.

(56) References Cited

U.S. PATENT DOCUMENTS

| | | | |
|---|---|---|---|
| 6,351,369 B1 | 2/2002 | Kuroda et al. | |
| 6,606,237 B1 * | 8/2003 | Naito et al. | 361/306.3 |
| 7,312,975 B2 * | 12/2007 | Togashi et al. | 361/321.1 |
| 2004/0169198 A1 * | 9/2004 | Nagata et al. | 257/200 |

FOREIGN PATENT DOCUMENTS

| | | |
|---|---|---|
| JP | A-7297077 | 10/1995 |
| JP | A-2001-148324 | 5/2001 |
| JP | A-2001-284170 | 10/2001 |

* cited by examiner

*Primary Examiner*—Lex Malsawma
(74) *Attorney, Agent, or Firm*—Oliff & Berridge, PLC

(57) ABSTRACT

A multilayer capacitor comprised of dielectric layers stacked to form a device body in which a plurality of first internal electrode layers and a plurality of second internal electrode layers formed in planar shapes are alternately arranged while being separated through the dielectric layers, wherein the first external electrodes and second external electrodes are arranged at only a first end face of the device body, lead use columnar electrodes connect the internal electrode layers stacked close to the first end face of the device body and external electrodes, interlayer connection use columnar electrodes connect the internal electrode layers stacked at the inside of the device body, and the interlayer connection use columnar electrodes have cross-sectional areas larger than the cross-sectional areas of the lead use columnar electrodes.

10 Claims, 3 Drawing Sheets

MULTILAYER CAPACITOR

BACKGROUND OF THE INVENTION

1. Field of the Invention

The present invention relates to a multilayer capacitor having through holes, more particularly relates to an easy-to-produce multilayer capacitor able to reduce the connection resistances between internal electrode layers in the stacking direction through the through holes while maintaining a low ESL without causing a reduction of the areas of the internal electrode layers.

2. Description of the Related Art

In recent years, the central processing units (CPUs) used for data processing systems have been made higher in operating frequency and have remarkably increased in consumed current due to improvements in their processing speed and their higher integration. Further, along with this, operating voltages have been reduced as a general tendency along with the reduction of the consumed power. Therefore, in the power supplies for supplying power to the CPUs, faster and larger current fluctuations are occurring. Keeping the voltage fluctuations accompanying such current fluctuations within the tolerances of the power supplies is becoming extremely difficult.

For this reason, multilayer capacitors functioning as smoothening capacitors are being arranged near CPUs while connected to the power supplies and are being frequently used as means for stabilization of the power supply. That is, at the time of high speed, transitory fluctuations in current, the multilayer capacitors quickly discharge to supply the CPUs with current and thereby keep down voltage fluctuations of the power supplies.

However, the increasingly higher operating frequencies of CPUs have led to faster speed and larger current fluctuations. The equivalent serial inductances (ESL) inherently possessed by the multilayer capacitors functioning as the smoothening capacitors are becoming relatively larger. As a result, the overall inductances including the equivalent serial inductances are now having a great effect on the voltage fluctuations of power supplies.

Therefore, as the structure of a conventional multilayer capacitor for reducing the ESL, there is for example the one disclosed in Japanese Patent Publication (A) No. 2001-284170. That is, this first publication discloses a structure designed to reduce the ESL by providing a plurality of terminal electrodes on each of the four side faces of a multilayer capacitor formed into a rectangular parallelepiped shape.

Further, as shown in Japanese Patent Publication (A) No. 2001-148324, a multilayer capacitor has been developed of a structure with external electrodes of isolated island shapes provided on at least one of the top and bottom surfaces of the multilayer capacitor and with these external electrodes connected by columnar shaped through hole electrodes to the internal electrode layers.

However, with a multilayer capacitor like in the first publication with pluralities of terminal electrodes provided on the four side faces and of a form for connection near a CPU, the ESL could not be sufficiently reduced and there were limits to the reduction of the overall inductance.

On the other hand, with a multilayer capacitor like in the second publication with island shaped external electrodes, the overall inductance becomes smaller and along with this higher speeds of CPUs can be handled. However, in a multilayer capacitor like in the second publication, a larger number of elongated through holes has to be formed inside the multilayer capacitor corresponding to the number of the external electrodes. This reduces the electrode areas of the internal electrode layers and is liable to reduce the electrostatic capacity.

Further, with elongated through holes, the connection resistances between the internal electrode layers in the stacking direction through the through holes are liable to increase and therefore the equivalent serial resistance (ESR) is liable to increase. Further, since a large number of elongated through holes are formed inside the multilayer capacitor, production of the multilayer capacitor becomes difficult. This becomes a factor increasing the production costs.

SUMMARY OF THE INVENTION

An object of the present invention is to provide an easy-to-produce multilayer capacitor able to reduce the connection resistances between internal electrode layers in the stacking direction through the through holes while maintaining a low ESL without causing a reduction of the areas of the internal electrode layers.

To achieve the above object, according to the present invention, there is provided a multilayer capacitor comprised of dielectric layers stacked to form a device body in which a plurality of first internal electrode layers and a plurality of second internal electrode layers formed in planar shapes are alternately arranged while being separated through the dielectric layers, the multilayer capacitor having first-external electrodes and second external electrodes arranged on only a first end face of the device body in a stacking direction of the dielectric layers, first lead use columnar electrodes connecting the first internal electrode layers stacked close to the first end face of the device body and the first external electrodes through first lead through holes, second lead use columnar electrodes connecting the second internal electrode layers stacked close to the first end face of the device body and the second external electrodes through second lead through holes, first interlayer connection use columnar electrodes connecting the first internal electrode layers stacked in the device body through first interlayer through holes, and second interlayer connection use columnar electrodes connecting the second internal electrode layers stacked at the inside of the device body through second interlayer through holes, the first and second interlayer connection use columnar electrodes having cross-sectional areas larger than the cross-sectional areas of the first and second lead use columnar electrodes.

In the multilayer capacitor according to the present invention, the first external electrodes and second external electrodes are arranged on the first end face in island shapes, so the ESL is reduced and the overall inductance becomes smaller. For this reason, the higher speeds of CPUs can be handled. In particular, the CPU power supplies can be reduced in voltage fluctuations. That is, the multilayer capacitor according to the present invention can be used as a smoothening capacitor enabling higher speeds of CPUs to be handled.

Further, in the multilayer capacitor according to the present invention, the lead use columnar electrodes for connection to the external electrodes and the interlayer connection use columnar electrodes for connection of the internal electrode layers present between the dielectric layers are formed separately. For this reason, the horizontal cross-sectional areas of the interlayer connection use columnar electrodes can be set larger than the horizontal cross-sectional areas of the lead use columnar electrodes. As a result, the connection resistances between the internal electrode layers in the stacking direction through the through holes can be reduced. Further, even if the numbers of the internal electrode layers are increased to increase the electrostatic capacity, the plurality of internal electrode layers can be more reliably connected and the functions as a multilayer capacitor can be more reliably exhibited.

Further, since the horizontal cross-sectional areas of the interlayer connection use columnar electrodes may be set larger than the horizontal cross-sectional areas of the lead use columnar electrodes, the numbers of the interlayer connection use columnar electrodes can be reduced compared with the numbers of the lead use columnar electrodes. For this reason, the areas of the internal electrode layers are no longer reduced due to the large number of interlayer connection use columnar electrodes and a sufficient electrostatic capacity can be secured.

Further, in the multilayer capacitor according to the present invention, since the lead use columnar electrodes and the interlayer connection use columnar electrodes are formed separately, there is no need to form elongated through holes extending from the external electrodes, so the multilayer capacitor can be more easily produced. Therefore, the multilayer capacitor can be reduced in production cost.

Preferably, the first and second interlayer connection use columnar electrodes have cross-sectional areas 2 to 16 times larger than the cross-sectional areas of the first and second lead use columnar electrodes, more preferably 4 to 8. If the multiple is too small, the actions and effects of the present invention are small, while if the multiple is too large, the areas of the internal electrodes are reduced and increase of the electrostatic capacity becomes difficult.

Preferably, the first and second interlayer connection use columnar electrodes have outside diameters of 150 to 200 µm, while the first and second lead use columnar electrodes have outside diameters of 50 to 80 µm. If the interlayer connection use columnar electrodes are too small in outside diameter, the actions and effects of the present invention are too small, while if too large, the areas of the internal electrodes are reduced and increasing the electrostatic capacity becomes difficult. Further, if the lead use columnar electrodes are too small in outside diameter, the connection resistance become too large, while if too large in outside diameter, arrangement of the external electrodes at a narrow pitch tends to become difficult.

Preferably, viewing the first end face of the device body from the vertical direction, the positions of formation of the first and second interlayer connection use columnar electrodes are offset from the positions of formation of the first and second lead use columnar electrodes. By forming these offset in position, it becomes possible to make the outside diameters of the lead use columnar electrode and the outside diameters of the interlayer connection use columnar electrodes different.

Preferably, the first external electrodes and second external electrode are arranged on the first end face adjoining each other in a matrix. By arranging the external electrodes in a matrix in this way, high frequency currents are generated flowing in opposite directions in the first external electrodes and second external electrodes, the magnetic fields cancel each other out, and the ESL can be reduced.

Preferably, the first interlayer connection use columnar electrodes and the second interlayer connection use columnar electrodes are alternately arranged in the device body along the side faces of the device body. By arranging the interlayer connection use columnar electrodes along the side faces of the device body, there is no longer a need to form through holes at the centers of the internal electrode layers, so the electrode layers forming the capacitor can be increased in areas. Further, compared with the centers of the internal electrode layers, at the peripheries, even if the interlayer connection use columnar electrodes are increased in outside diameter, a greater distance between the electrodes can be more secured.

Preferably, the first internal electrode layer closest to the first end face is formed with insulated hole patterns for avoiding electrical connection with the second lead use columnar electrodes, the second internal electrode layer closest to the first end face is formed with insulated hole patterns for avoiding electrical connection with the first interlayer connection use columnar electrodes, the other first internal electrode layers are formed with insulated hole patterns for avoiding electrical connection with the second interlayer connection use columnar electrodes, and the other second internal electrode layers are formed with insulated hole patterns for avoiding electrical connection with the first interlayer connection use columnar electrodes. By forming such insulated hole patterns, it is possible to prevent short circuits between electrodes of different polarities.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Figure 1:
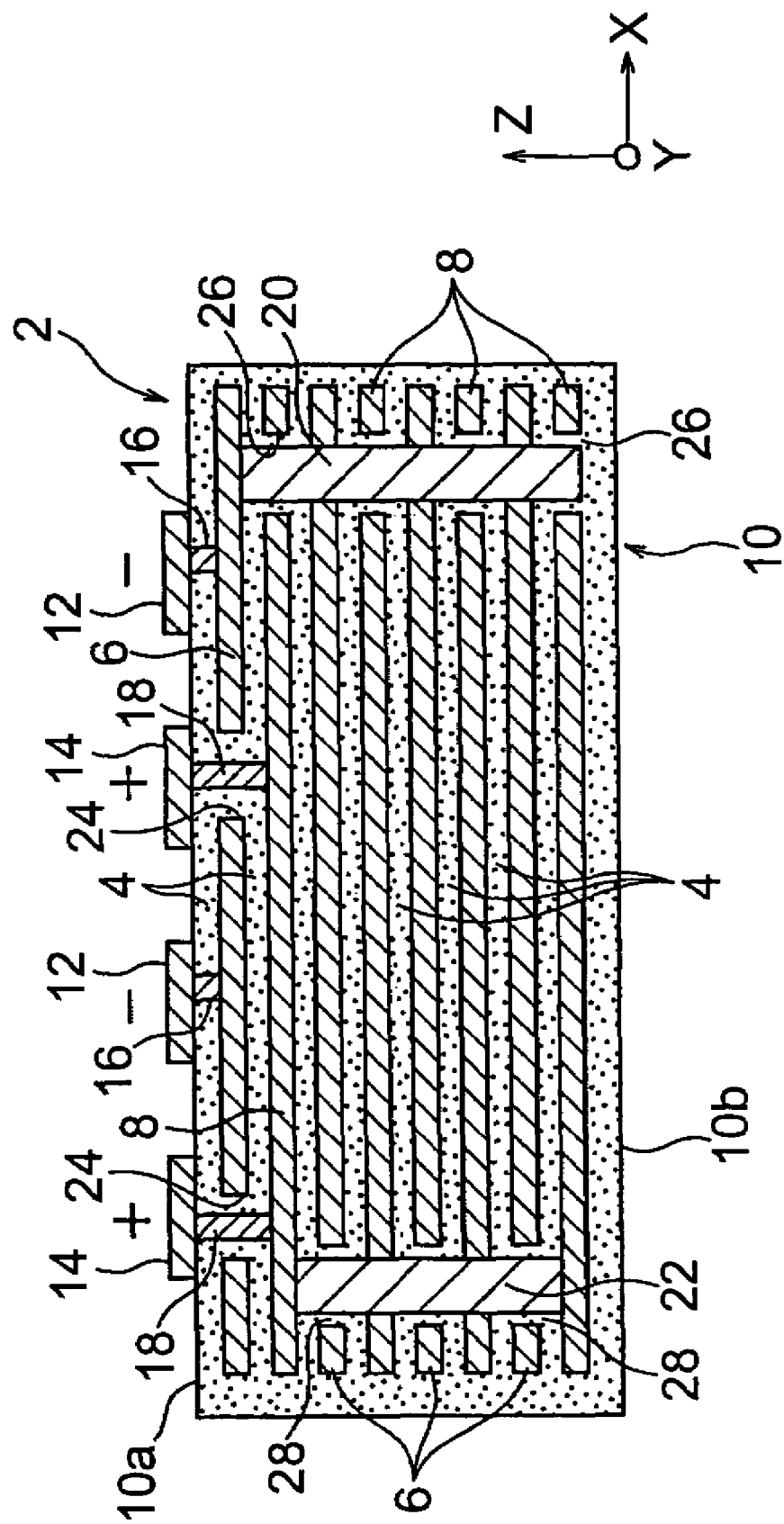
FIG. 1 is a cross-sectional view of principal parts of a multilayer capacitor according to a first embodiment of the present invention.
Figure 2:
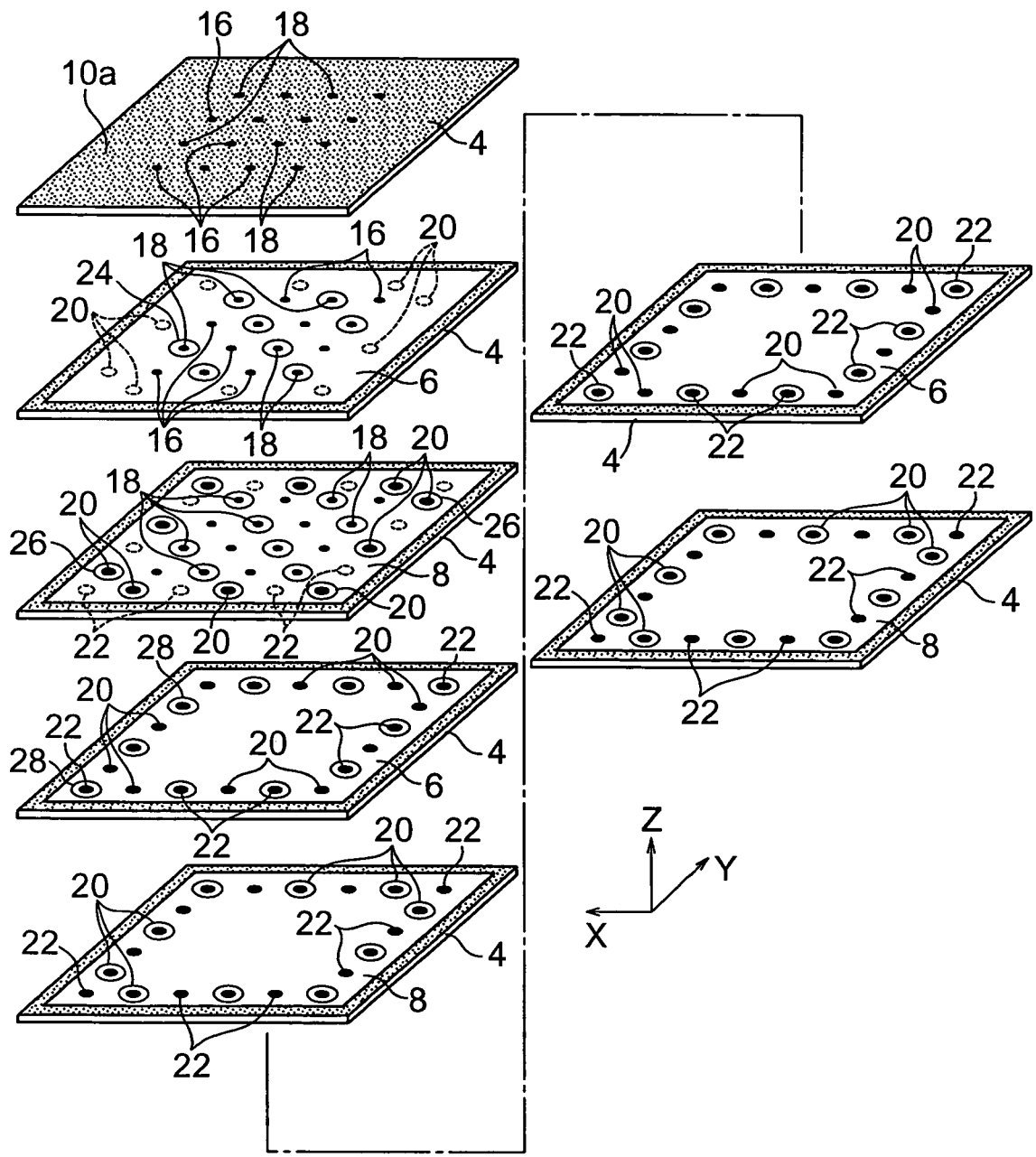
FIG. 2 is a disassembled perspective view of the multilayer capacitor shown in FIG. 1.
Figure 3:
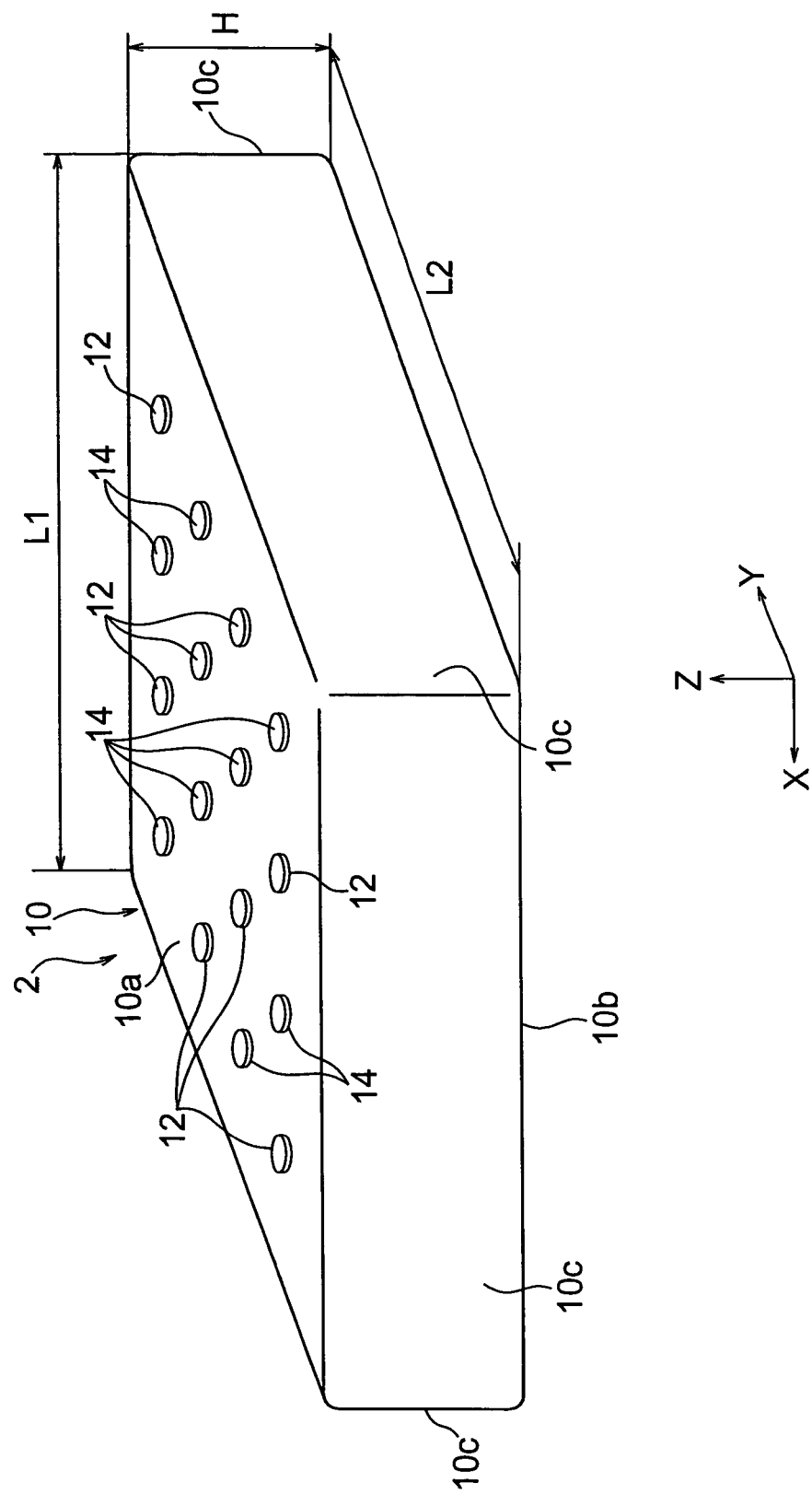
FIG. 3 is a schematic perspective view of the multilayer capacitor shown in FIG. 1.

As shown in FIG. 1 to FIG. 3, a multilayer capacitor 2 according to an embodiment of the present invention has a device body 10. The device body 10 is provided with first external terminals 12 and second external terminals 14 arranged in a matrix at only a first end face 10a in the stacking direction (Z-axial direction) of the dielectric layers 4. The device body 10 is not provided with external terminals 12 and 14 at a second end face 10b and the four side faces 10c.

Inside the device body 10, first internal electrode layers 6 and second internal electrode layers 8 are alternately stacked via dielectric layers 4. The device body 10 is a rectangular parallelopiped in shape and is obtained by stacking and firing a plurality of ceramic green sheets for forming the dielectric layers 4 together with electrode paste layers for forming the internal electrode layers 6 and 8.

In the present embodiment, the vertical and horizontal dimensions L1 and L2 of the device body 10 shown in FIG. 3 are for example set to 10 mm. Further, the height dimension H is for example set to 0.85 mm. In the device body 10, as shown in FIG. 1 and FIG. 2, first internal electrode layers 6 formed into planar shapes are provided at predetermined height (Z-axial direction) positions.

Below a first internal electrode layer 6, a second internal electrode layer 8 formed into a planar shape in the same way as the first internal electrode layer 6 is formed via a dielectric layer 4. Below a second internal electrode layer 8, a first internal electrode layer 6 is formed via a dielectric layer 4. In this way, a plurality of first internal electrode layers 6 and second internal electrode layers 8 are stacked inside the device body 2 alternately via dielectric layers 4.

These first internal electrode layers 6 and second internal electrode layers 8 are centered at substantially the same positions as the center of the XY plane in the device body 10. Further, the vertical and horizontal dimensions of the internal electrode layers 6 and internal electrode layers 8 are made somewhat smaller than the lengths of the corresponding sides of the device body 10. For this reason, these peripheries of the internal electrode layers 6 and internal electrode layers 8 are not exposed from the side faces 10c of the device body 10 in structure.

As shown in FIG. 1 and FIG. 2, column shaped first lead use columnar electrodes 16 and second lead use columnar electrodes 18 are provided near the first end face 10a corresponding to the first external electrodes 12 and second external electrodes 14 in directions extending perpendicular to these internal electrode layers 6 and 8 (Z-axial direction). The first external electrodes 12 and second external electrodes 14, as shown in FIG. 3, are arranged in a matrix in the X-axial and Y-axial directions. These external electrodes 12 and 14 are arranged so as to adjoin each other in the X-axial and Y-axial directions.

The dielectric layer 4 positioned at the topmost part of the device body 10 in the Z-axial direction, as shown in FIG. 2, is formed with through holes corresponding to the numbers of the external electrodes 12 and 14 shown in FIG. 3. Inside them, first and second lead use columnar electrodes 16 and 18 are formed. As shown in FIG. 1 and FIG. 2, the first lead use columnar electrodes 16 are through hole electrodes for connecting the first external electrodes 12 arranged on the first end face 10c of the device body 10 and the single first internal electrode layer 6 arranged closest to the first end face 1c.

The second lead use columnar electrodes 18 are through hole electrodes for connecting the second external electrodes 14 arranged on the first end face 10c of the device body 10 and the single second internal electrode layer 8 arranged closest to the first end face 10c. The second lead use columnar electrodes 18 are prevented from short-circuiting with the first internal electrode layer 6 positioned closest to the first end face 10a by forming the first internal electrode layer 6, as shown in FIG. 2, with insulated hole patterns 24 for avoiding electrical connection with the second lead use columnar electrodes 18.

The bottom surface of the first internal electrode layer 6 closest to the first end face 10a in the Z-axial direction has connected to it, along its circumference, top parts of a plurality of first interlayer connection use columnar electrodes 20 connected to it. The second internal electrode layer 8 closest to the first end face 10a is prevented from short-circuiting with the first interlayer connection use columnar electrodes 20 by formation of insulated hole patterns 26 as shown in FIG. 2.

The first interlayer connection use columnar electrodes 20 are designed to connect all of the first internal electrode layers 6 stacked at the inside of the device body 10 together through the first interlayer through holes and are designed so as not to be connected to the second internal electrode layers 8 due to the insulated hole patterns 26 formed at the second internal electrode layers 8.

In the present embodiment, the first interlayer connection use columnar electrodes 20 extend from the bottom surface of the first internal electrode layer 6 closest to the first end face 10a in the Z-axial direction to the bottom surface of the second internal electrode layer 8 closest to the second end face 10b in the Z-axial direction and are not exposed at the second end face 10b. However, in the present invention, the first interlayer connection use columnar electrodes 20 are not required to be connected to the second internal electrode layers 8, so need only extend to the first internal electrode layer 6 closest to the second end face 10b. They are not necessarily required to extend to the second internal electrode layer 8 positioned at the bottommost end in the Z-axial direction. When the layer positioned at the bottommost end in the Z-axial direction is a first internal electrode layer 6, the bottom ends of the first interlayer connection use columnar electrodes 20 extend down to this position.

The bottom surface of the second internal electrode layer 8 closest to the first end face 10a in the Z-axial direction has connected to it, along its circumference, top parts of a plurality of second interlayer connection use columnar electrodes 22 connected to it. The second interlayer connection use columnar electrodes 22 are designed to connect all of the second internal electrode layers 8 stacked at the inside of the device body 10 together through the second interlayer through holes and are designed so as not to be connected to the first internal electrode layers 6 due to the insulated hole patterns 28 formed at the first internal electrode layers 6.

In the present embodiment, the second interlayer connection use columnar electrodes 22 extend from the bottom surface of the second internal electrode layer 8 closest to the first end face 10a in the Z-axial direction to the second internal electrode layer 8 closest to the second end face 10b and are not exposed at the second end face 10b. However, in the device body 10, when the layer positioned at the bottommost end in the Z-axial direction is a second internal electrode layer 8, the bottom ends of the second interlayer connection use columnar electrodes 22 do not have to extend down to this position.

The first interlayer connection use columnar electrodes 20 have horizontal cross-sectional areas about the same extent as the horizontal cross-sectional areas of the second interlayer connection use columnar electrodes 22, while the first lead use columnar electrodes 16 have horizontal cross-sectional areas of about the same extent as the horizontal cross-sectional areas of the second lead use columnar electrodes 18. Further, the first and second interlayer connection use columnar electrodes 20 and 22 have horizontal cross-sectional areas 2 to 16 times or so larger than the horizontal cross-sectional areas of the first and second lead use columnar electrode 16 and 18.

The first and second interlayer connection use columnar electrodes 20 and 22 have outside diameters of 150 to 200 µm in range, while the first and second lead use columnar electrodes 16 and 18 have outside diameters of 50 to 80 µm in range.

In the present embodiment, viewing the first end face 10a of the device body 10 from the vertical direction (Z-axial direction), the positions of formation of the first and second interlayer connection use columnar electrodes 20 and 22 are offset from the positions of formation of the first and second lead use columnar electrodes 16 and 18.

In the present embodiment, the first and second lead use columnar electrodes 16 and 18 are arranged in a matrix at the center of the first internal electrode layer 6 close to the first end face 10a. Further, the first interlayer connection use columnar electrodes 20 and the second interlayer connection use columnar electrodes 22 are alternately arranged in the device body 10 along the side faces 10c of the device body 10.

These columnar electrodes 16, 18, 20, and 22 may be formed in the same way as the internal electrode layers 6 and 8 when forming the internal electrode layers 6 and 8 by printing of electrode paste.

In the multilayer capacitor 2 according to the present embodiment, the first external electrodes 12 and second external electrodes 14 are arranged on the first end face 10a in island shapes, so the ESL is lowered and the overall inductance becomes smaller. For this reason, higher speeds of CPUs can be handled. In particular, CPU power supplies can be reduced in voltage fluctuations. That is, the multilayer capacitor 2 according to the present embodiment can be used as a smoothening capacitor enabling higher speeds of CPUs to be handled.

Further, in the-multilayer capacitor 2 according to the present embodiment, the lead use columnar electrodes 16 and 18 for connection to the external electrodes 12 and 14 and the interlayer connection use columnar electrodes 20 and 22 for connection of the internal electrode layers 6 and 8 present between the dielectric layers 4 are formed separately. For this reason, the horizontal cross-sectional areas of the interlayer connection use columnar electrodes 20 and 22 can be set larger than the horizontal cross-sectional areas of the lead use columnar electrodes 16 and 18. As a result, the connection resistance between the internal electrode layers 6 and 8 in the stacking direction through the through holes can be reduced. Further, even if the numbers of the internal electrode layers 6 and 8 are increased for high electrostatic capacity, the plurality of internal electrode layers 6 and 8 can be more reliably connected and the functions as a multilayer capacitor 2 can be more reliably exhibited.

Further, since the horizontal cross-sectional areas of the interlayer connection use columnar electrodes 20 and 22 may be set larger than the horizontal cross-sectional areas of the lead use columnar electrodes 16 and 18, the numbers of the interlayer connection use columnar electrodes 20 and 22 can be reduced compared with the numbers of the lead use columnar electrodes 16 and 18. For this reason, the areas of the internal electrode layers 6 and 8 are no longer reduced due to the large number of interlayer connection use columnar electrodes 20 and 22 and a sufficient electrostatic capacity can be secured.

Note that in the illustrated embodiment, there are a total of 20 interlayer connection use columnar electrodes 20 and 22—more than the total 16 lead use columnar electrodes 16 and 18, but the present invention is not limited to the illustrated example. The number can be reduced. For example, it is also possible to provide one of the interlayer connection use columnar electrodes 20 and 22 at each of the four corners for a total of four. Alternatively, it is also possible to provide one at each of the four corners and one at the center of each side for a total of eight interlayer connection use columnar electrodes 20 and 22. Alternatively, it is also possible to provide one at each of the four corners and two at each side for a total of 12 interlayer connection use columnar electrodes 20 and 22.

Further, in the multilayer capacitor 2 according to the present embodiment, since the lead use columnar electrodes 16 and 18 and the interlayer connection use columnar electrodes 20 and 22 are formed separately, there is no need to form elongated through holes extending from the external electrodes 12 and 14, so the multilayer capacitor 2 can be more easily produced. Therefore, the multilayer capacitor 2 can be reduced in production cost.

Further, in the present embodiment, the first external electrodes 12 and the second external electrodes 14 are arranged at the first end face 10*a* so as to adjoin each other in a matrix, so high frequency currents are generated flowing in opposite directions in the first external electrodes 12 and second external electrodes 14, the magnetic fields cancel each other out, and the ESL can be reduced furthermore.

Still further, the first interlayer connection use columnar electrodes 20 and the second interlayer connection use columnar electrodes 22 are alternately arranged in the device body 10 along the side faces 10*c* of the device body 10. For this reason, at all internal electrode layers 6 and 8 other than the internal electrode layers positioned close to the first end face 10*a*, there is no longer a need to form through holes at the centers of the internal electrode layers 6 and 8, so the electrode layers 6 and 8 forming the capacitor can be increased in areas. Further, compared with the centers of the internal electrode layers 6 and 8, at the peripheries, even if the interlayer connection use columnar electrodes 20 and 22 are increased in outside diameter, a greater distance between the electrodes can be more secured.

While the invention has been described with reference to specific embodiments chosen for purpose of illustration, it should be apparent that numerous modifications could be made thereto by those skilled in the art without departing from the basic concept and scope of the invention. For example, the number of the external electrodes 12 and 14 formed is not particularly limited. They may also be formed in a matrix of 8×8 for a total of 64 etc.

The invention claimed is:

1. A multilayer capacitor comprised of dielectric layers stacked to form a device body in which a plurality of first internal electrode layers and a plurality of second internal electrode layers formed in planar shapes are alternately arranged while being separated through the dielectric layers, said multilayer capacitor comprising:

first external electrodes and second external electrodes arranged on only a first end face of said device body in a stacking direction of said dielectric layers, and a second end face of said device body being parallel to the first end face being an insulator, first lead use columnar electrodes connecting to only one of said first internal electrode layers stacked closest to the first end face of said device body and said first external electrodes through first lead through holes, second lead use columnar electrodes connecting to only one of said second internal electrode layers stacked closest to the first end face of said device body and said second external electrodes through second lead through holes, first interlayer connection use columnar electrodes connecting said first internal electrode layers stacked at the inside of said device body through first interlayer through holes, and second interlayer connection use columnar electrodes connecting said second internal electrode layers stacked at the inside of said device body through second interlayer through holes, wherein said first and second interlayer connection use columnar electrodes have horizontal cross-sectional areas larger than horizontal cross-sectional areas of said first and second lead use columnar electrodes, the first interlayer connection use columnar electrodes and the second interlayer connection use columnar electrodes are alternately arranged at the inside of the device body only along the side faces of the device body, and the first lead use columnar electrodes and the second lead use columnar electrodes are alternately arranged in a matrix form viewed from plane angle at the inside of the device body with respect to first interlayer connection use columnar electrodes and the second interlayer connection use columnar electrodes.

2. The multilayer capacitor as set forth in claim 1, wherein said first and second interlayer connection use columnar electrodes have cross-sectional areas 2 to 16 times larger than the cross-sectional areas of said first and second lead use columnar electrodes.

3. The multilayer capacitor as set forth in claim 2, wherein said first and second interlayer connection use columnar electrodes have outside diameters of 150 to 200 μm, while said first and second lead use columnar electrodes have outside diameters of 50 to 80 μm.

4. The multilayer capacitor as set forth in claim 2, wherein viewing the first end face of the device body from the vertical direction, the positions of formation of the first and second interlayer connection use columnar electrodes are offset from the positions of formation of the first and second lead use columnar electrodes.

5. The multilayer capacitor as set forth in claim 2, wherein said first external electrodes and second external electrode are arranged on said first end face adjoining each other in a matrix.

6. The multilayer capacitor as set forth in claim 2, wherein
the first internal electrode layer closest to said first end face is formed with insulated hole patterns for avoiding electrical connection with said second lead use columnar electrodes,
said second internal electrode layer closest to said first end face is formed with insulated hole patterns for avoiding electrical connection with said first interlayer connection use columnar electrodes,
the other first internal electrode layers are formed with insulated hole patterns for avoiding electrical connection with said second interlayer connection use columnar electrodes, and
the other second internal electrode layers are formed with insulated hole patterns for avoiding electrical connection with said first interlayer connection use columnar electrodes.

7. The multilayer capacitor as set forth in claim 1, wherein said first and second interlayer connection use columnar electrodes have outside diameters of 150 to 200 μm, while said first and second lead use columnar electrodes have outside diameters of 50 to 80 μm.

8. The multilayer capacitor as set forth in claim 1, wherein viewing the first end face of the device body from the vertical direction, the positions of formation of the first and second interlayer connection use columnar electrodes are offset from the positions of formation of the first and second lead use columnar electrodes.

9. The multilayer capacitor as set forth in claim 1, wherein said first external electrodes and second external electrodes are arranged on said first end face adjoining each other in a matrix.

10. The multilayer capacitor as set forth in claim 1, wherein
the first internal electrode layer closest to said first end face is formed with insulated hole patterns for avoiding electrical connection with said second lead use columnar electrodes,
said second internal electrode layer closest to said first end face is formed with insulated hole patterns for avoiding electrical connection with said first interlayer connection use columnar electrodes,
the other first internal electrode layers are formed with insulated hole patterns for avoiding electrical connection with said second interlayer connection use columnar electrodes, and
the other second internal electrode layers are formed with insulated hole patterns for avoiding electrical connection with said first interlayer connection use columnar electrodes.

\* \* \* \* \*